United States Patent [19]

Fuller

[11] Patent Number: 4,809,164

[45] Date of Patent: Feb. 28, 1989

[54] PROCESSOR CONTROLLED MODIFYING OF TABLED INPUT/OUTPUT PRIORITY

[75] Inventor: William T. Fuller, San Jose, Calif.

[73] Assignee: Tandem Computers Incorporated, Cupertino, Calif.

[21] Appl. No.: 844,911

[22] Filed: Mar. 26, 1986

[51] Int. Cl.[4] .................. G06F 13/26; G06F 9/46; G06F 3/00

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 3,905,025 | 9/1975 | Davis et al. | 364/200 |
| 3,949,369 | 4/1976 | Churchill, Jr. | 364/200 |
| 4,038,642 | 7/1977 | Bouknecht et al. | 364/900 |
| 4,156,796 | 5/1979 | O'Neal et al. | 364/900 |
| 4,232,294 | 11/1980 | Burke et al. | 364/200 |
| 4,371,932 | 2/1983 | Dinwiddie, Jr. et al. | 364/200 |
| 4,400,771 | 8/1983 | Suzuki et al. | 364/200 |
| 4,405,981 | 9/1983 | Yu et al. | 364/200 |
| 4,412,285 | 10/1983 | Neches et al. | 364/200 |
| 4,463,445 | 7/1984 | Grimes | 364/900 |
| 4,484,271 | 11/1984 | Miu | 364/200 |
| 4,489,385 | 12/1984 | Miller et al. | 364/493 |
| 4,543,629 | 9/1985 | Carey et al. | 364/200 |
| 4,547,850 | 10/1985 | Genma | 364/200 |
| 4,591,967 | 5/1986 | Mattes et al. | 364/132 |
| 4,648,065 | 3/1987 | Zenk et al. | 364/900 |
| 4,675,812 | 6/1987 | Capowski | 364/200 |

*Primary Examiner*—Archie E. Williams, Jr.
*Assistant Examiner*—Eric Coleman
*Attorney, Agent, or Firm*—Townsend and Townsend

[57] ABSTRACT

An apparatus determines the order of data communication between a plurality of peripheral devices that wish to do so and a central processor unit. Determination is made according to one of a number of selectable priority schedules. The apparatus is modifiable by programmed control so that certain of the peripheral devices can have their priorities reconfigured depending upon changing circumstances.

1 Claim, 2 Drawing Sheets

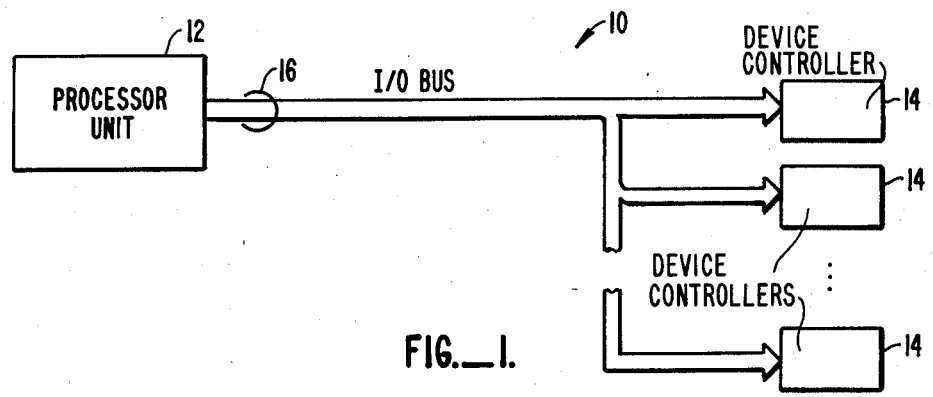
FIG._1.
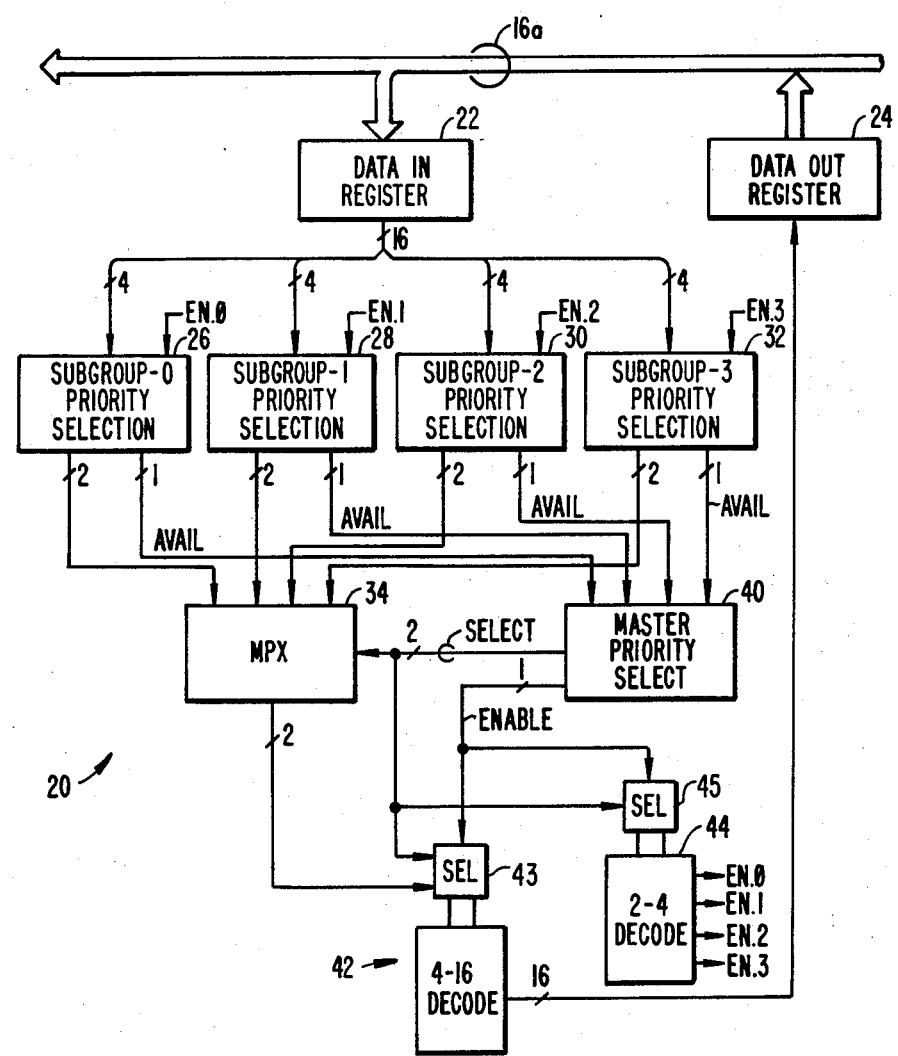
FIG._2.

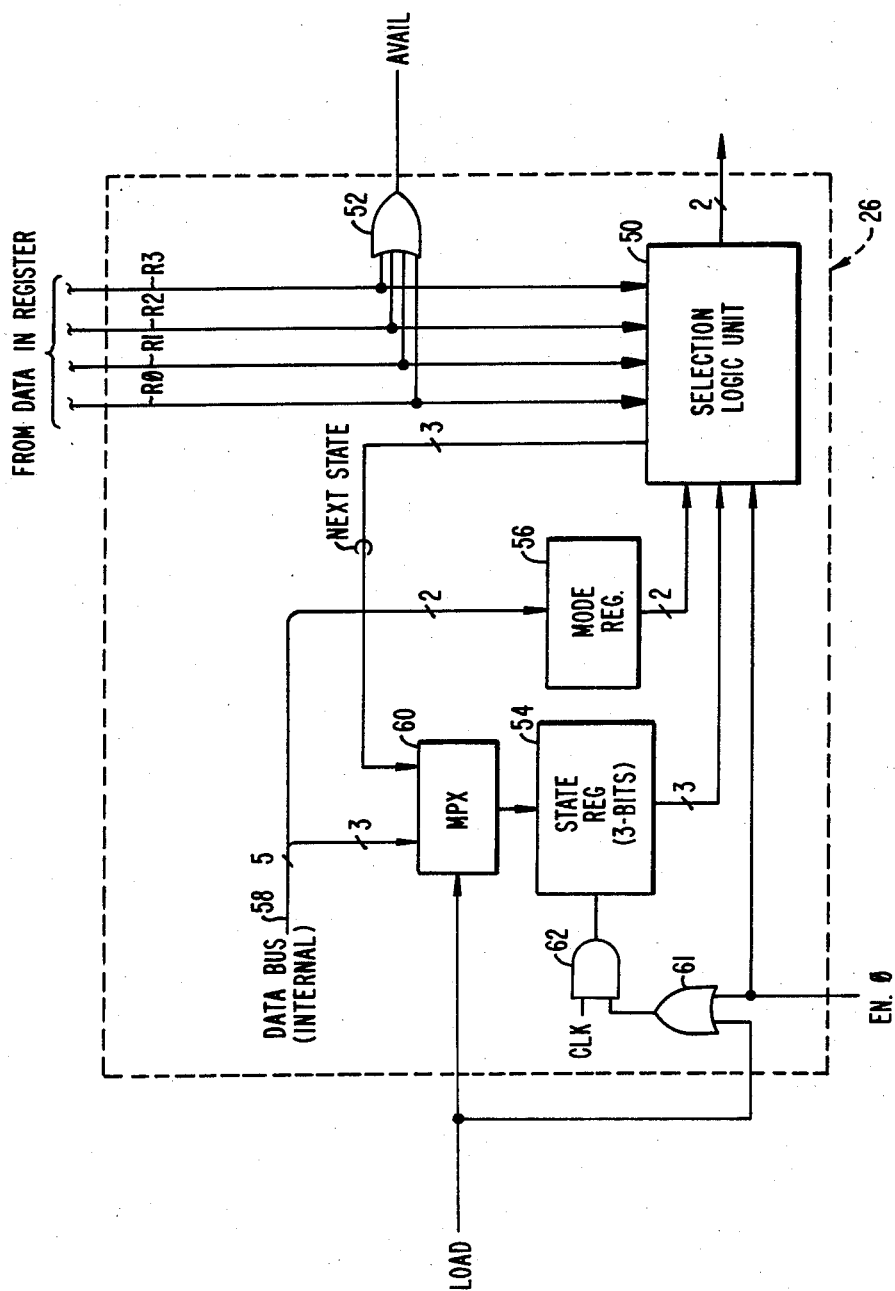
FIG._3.

PROCESSOR CONTROLLED MODIFYING OF TABLED INPUT/OUTPUT PRIORITY

BACKGROUND OF THE INVENTION

The invention is directed generally to data communications between a processor unit and a number of peripheral devices of a data processing system. More particularly, the invention relates to a modifiable input/output priority selection apparatus that permits the processor unit to serve a plurality of peripheral devices desiring to communicate with the processor unit by determining the order of communication.

Many of today's data processing systems include a central processing unit that is coupled to a variety of peripheral devices that store data, receive data from remote sources, or (in the case of terminal and keyboard units, for example) provide a communication interface between a user and the processing system itself. Often, the peripheral devices communicate over a single bus system of one sort or another, so that in order to avoid data communication collisions, when two or more of the peripheral devices require interaction with the processor unit, the ordering of such interaction or communication with the separate devices must be established.

This ordering, however, must also take into account the speed with which different types of peripheral devices can communicate data, and the permanency of the data to be communicated (i.e., how long will the data be available before lost if not transmitted). For example, control devices for communications equipment sometimes will have data buffers that are very small (two bytes). When a communications control device wants to transfer data to the processor unit, it must do so almost immediately. Accordingly, the ordering determination is often done according to various priorities assigned to the peripheral devices. These priority assignments specify which peripheral device receives attention first if more than one requires the processor unit at a given time.

In one form of prioritization heretofore used, peripheral device priorities are based upon the position of the peripheral device along a daisy-chained input/output (I/O) bus. Changing the assigned priority of a peripheral device, therefore, requires physical relocation of the peripheral device along the I/O bus.

Yet another prioritization technique relies upon switch settings in the peripheral device which set the priority of that device, relative to other devices coupled to the same I/O bus. Again, although no physical relocation of the peripheral device is necessary to modify its priority in the hierarchy of prioritization, a physical act must still be taken to reset the switches if the assigned priority of a peripheral device is to be changed.

Thus, while various prioritizing techniques are known, none provides any real flexibility in changing assigned priorities without some form of system reconfiguration by physical means.

SUMMARY OF THE INVENTION

According to the present invention, therefore, there is provided apparatus that is modifiable by programmed control to selectively reconfigure the prioritization of data communications between a number of peripheral devices and a central processing unit. In addition, the apparatus provides automatic readjustment of the prioritization to give certain peripheral devices higher priority than others for one period of time, and then restructuring to grant other peripheral devices higher priorities than before.

Broadly, the present invention comprises a presettable register for containing information used to select one of a number of available predetermined priority schedules; each schedule assigns data communication priorities to a number of peripheral units forming a part of a data processing system. Logic is provided for combining the information with data that indicates which of the peripheral devices desire communication with the processor unit, producing therefrom a selection signal that identifies the highest priority peripheral device desiring data communication. After selection of the peripheral is made, the presettable register can be modified to select another of the predetermined priority schedules, or left to specify the same priority schedule, as desired.

The presettable register is accessible to the processor unit. This allows program control over priority schedule selection.

BRIEF DESCRIPTION OF THE DRAWINGS

FIG. 1 is a representative illustration of a data processing system that includes at least one processor unit coupled to a plurality of device controllers that, in turn, each control one or more peripheral devices (not shown);

FIG. 2 is a block diagram that illustrates generally the priority selection apparatus of the present invention; and FIG. 3 is a block diagram of one of the subgroup priority selection devices of the invention of FIG. 2.

DETAILED DESCRIPTION OF THE INVENTION

The present invention is used in a multiprocessor system of the type disclosed in U.S. Pat. No. 4,228,496, and is an improvement of the prioritization technique used therein. Generally, some form of prioritization schedule is needed when two or more peripheral devices desire communication with a processor unit. Certain peripheral devices (such as, for example, a communications controller, which may have a very small data buffer and, therefore, the need to empty that buffer promptly) require a higher frequency of attention than other devices (such as, for example, keyboards and terminals). Accordingly, higher priority is usually given to those devices that must unload data quickly to the high-speed devices, and the like, while a lower priority is given to slower devices.

Illustrated in FIG. 1 is a data processing system, designated generally with the reference numeral 10, comprising at least one processor unit 12 coupled to a plurality of device controllers 14 by an input/output (I/O) bus 16. Although not specifically shown, it will be understood by those skilled in this art that each device controller 14 will have attached to it peripheral devices (not shown) such as disk drives, tape units, terminals, data communications equipment (i.e., modems), and the like. Each device controller 14 is responsible for selecting one of its peripheral devices for communication with the processor unit 12 when required.

Generally, data communications are initiated in the first instance by the processor unit 12 when it desires to retrieve information from a peripheral device (not shown), or wishes to store information thereat. Accordingly, a request signal is sent by the processor unit 12, via the I/O bus 16, to the device controller 14 associated with the peripheral device (not shown) that has the desired information, or is to be the location at which information will be stored. The device controller 14, in turn, goes through a process of setting up the peripheral device (not shown) for the communication, signaling the processor unit 12 when ready to transfer data.

It is not uncommon to have a number of device controllers 14 ready to transfer at any one time in response to data transfer requests that have been made by the processor unit 12. The processor unit 12 is then faced with the task of determining which of the device controllers 14 desire communication, and arrange the communication colloquy with the device controllers in an orderly fashion, preferably pursuant to some form of prioritization schedule. For a further discussion of how data communications between processor units and device controllers 14 via the I/O bus 16 may be handled, the reader is referred to U.S. Pat. No. 4,228,496, the disclosure of which is incorporated herein by reference. Determination of the order of communications is the concern of the present invention, and FIG. 2 shows preferred apparatus for determining such order.

Referring now to FIG. 2, a modifiable input/output priority selection apparatus, designated generally/with the reference numeral 20, is shown as receiving a portion 16a of the I/O bus 16 (FIG. 1) at a data-in register 22. The I/O bus portion 16a includes a 16-bit, bidirectional data bus that communicates data between the processor unit 12 and the device controllers 14, according to one of a number of prioritization schedules maintained by the priority selection apparatus 20. Also coupled to the I/O bus portion 16a is a 16-bit data-out register 24. The I/O bus portion 16a is also coupled to the circuitry (not shown) in the processor unit 12 for actually handling the data transfers between the processor unit and the device controllers 14 (using the data-in and data-out registers 22, 24).

Data-in and data-out registers 22, 24 are used for polling and selection. In the manner described in more detail in the above-referenced U.S. Pat. No. 4,228,496, each bit position of the data-in register 22 corresponds to a specific device controller 14. During polling, those device controllers 14 requiring or requesting a data transfer between it and the processor unit 12 will set its corresponding bit position in the data-in register 22 to a ONE. At the completion of a poll one or more of the 16 available bit positions may be set to a ONE, indicating that the device controllers 14 are ready for data communication.

The content of the data-in register 22 is coupled, in four-bit groups, to subgroup priority selection circuits 26, 28/ 30 and 32. If two or more of the bit positions of any four-bit group are set to a ONE, the corresponding subgroup priority selection circuits 26–32 determine from this information, according to a prearranged priority, which device controllers corresponding to the set bit positions shall be selected to communicate first.

An encoded representation of the selected device controller 14 is coupled from the subgroup priority selection circuits 26–32 to a multiplex circuit (MPX) 34. In addition, each subgroup priority selection circuit 26–32 couples an available (AVAIL) signal, indicating that one or more of the device controllers 14 associated with the particular subgroup priority selection circuit is ready, to a master priority selection circuit 40. The master priority selection circuit 40 functions, in turn, to select among the subgroup priority selection circuits 26–32 as to which subgroup of device controllers 14 shall proceed with data communication, in much the same manner that the subgroup priority selection circuits operate. The master priority selection circuit 40 produces a SELECT signal that is applied to the selection inputs of the MPX 34 to select which of the encoded outputs of the subgroup priority selection circuits 26–32 are to be coupled to a 4-to-16 decode circuit 42.

The SELECT signal from the master priority selection circuit 40 and the output of the MPX 34 form a complete identification of which of the device controllers 14 have been selected, in encoded form. This 4-bit encoded designation is applied to, and decoded by, the 4-to-16 decoder 42, when enabled by an ENABLE signal provided by the master priority selection circuit 40. The 16-bit output of the 4–16 decoder 42 is coupled to the data-out register 24, and used to set one bit position of the data-out register 24, corresponding to the selected device controller. The processor unit 12 will then communicate the contents (15 ZEROs and one ONE) data-out register 24 to the data bus 16a. The device controller assigned to the bit-position of the data-out register 24 is thereby informed that it is selected.

The SELECT and ENABLE signals generated by the master priority select circuit 40 are communicated to a 2-to-4 decode circuit 44. The ENABLE signal initiates (enables) operation of the 2-4 decode circuit, while the SELECT signal, which identifies the selected device controller subgroup, is used to produce an enable signal (EN.∅–EN.3) that is used to modify the priority schedule of the corresponding subgroup priority selection circuit, as will be described below. The signals EN.∅–EN.3 are respectively coupled to the subgroup priority selection circuits 26–32. Only one of the signals EN.∅–EN.3 will be active at any one time.

Before beginning a discussion of the architecture of the individual subgroup priority selection circuits 26–32 and the master priority selection circuit 40, it may be beneficial to understand the role played by the priority selection apparatus 20 in prioritizing communications between the processor unit and two or more of the device controllers 14. As indicated above, a data communication on the I/O bus 16 is initiated when a data transfer command is sent by the processor unit 12 to a one of the device controllers 14 (to which is connected the peripheral unit (not shown) with which the communication is involved). The processor unit 12 then resumes normal processing activity, awaiting a "Ready" signal from the designated device controller 14, indicating that it is ready to send or receive data, depending upon the request made by the processor unit 12.

At times, a number of requests may be issued by the processor unit 12, often resulting in a number of Ready indications pending and requiring response by the processor unit 12. In such situations the processor unit 12 must first determine which (out of all available) controllers 14 are requesting service, and if there are two or more, what their priorities are. Accordingly, the processor unit 12 will issue commands on the command lines of I/O bus 16 to "poll" the device controllers 14, causing each device controller 14 to apply a ONE on the data line of the I/O bus portion 16a to which that particular device controller 14 is assigned. The content of the I/O bus portion 16a is set in the data register 22, and the "polling" sequence is terminated. Thus, at the end of the poll, the content of the data-in register 22 will contain an indication, by each bit position containing a ONE, of which of the device controllers 14 are ready for communication.

The subgroup priority selection circuit 26 is illustrated in greater detail in FIG. 3. The architecture, function and operation of the subgroup priority selections circuits 28, 30 and 32 are substantially identical in nature, so that any discussion of the subgroup priority selection circuit 26 should be understood as being applicable to the subgroup priority selection circuits 28–32 equally. Substantially the same can be said about the master priority selection circuit 40; although there are some differences, the design and function of the master priority selection circuit is basically the same as any of the subgroup priority selection circuits 26–32. Accordingly, the following description of subgroup priority selection circuit 26 should be taken to apply equally to the subgroup and master priority selection circuits 28–32 and 40, except as noted.

Referring now to FIG. 3, the subgroup priority selection circuit 26 is illustrated as receiving its 4-bit subgroup information on requestor lines RØ, R1, R2 and R3 from the data-in register 22 (FIG. 2) at a selection logic unit 50. The 4-bit- subgroup signal lines are also applied to an OR gate 52, producing the AVAIL signal that is communicated to the master priority selection circuit 40.

Also applied to the selection logic unit 50 are the contents of a 3-bit- state register 54 and a 2-bit mode register 56. These two registers are presettable from data that is communicated from a five-bit portion of an internal data bus 58 from the CPU (not shown) of the processor unit 12. Three bits of the internal data bus 58 are coupled to the state register 54 through a multiplex circuit (MPX) 60, while the remaining two bits of the internal data bus 58 are coupled directly to the mode register 56. The state register 54 also receives three bits of NEXT STATE information from the selection logic unit 50. Control of the MPX 60 to select the source of data to be set in the state register 54 is effected by a LOAD signal produced by the CPU (not shown). When present, the LOAD signal routes the three-bit portion of the internal data bus 58 to the data input of the state register. When not present the MPX 60 defaults to selection of the NEXT STATE information.

The LOAD signal is padded through an OR gate 61 to an AND gate 62, and used to gate a CLK signal to set the output of the MPX 60 into the state register 54. The state register 54 is also enabled, for loading, by the EN.Ø signal from the 2-to-4 decode circuit 44 (FIG. 2).

The state register 54 defines which one of eight available prioritization schedules are to be used. In addition, the capability of periodically presetting the state register 54 (either with the NEXT STATE information or data on the bus 58) allows the prioritization schedules to be cycled through in various orders. The mode register 56 defines the particular order of cycling, or whether or not any cycling will be used at all. Table I, below, sets forth the priority schedules available, showing the "Current State" content of the state register 54 used to select one of the available eight priority schedules, and the "Next State" that the state register 54 will be set to (by the NEXT STATE information) when a state transition is made.

TABLE I

| MODE = 11 | | | MODE = Ø1 | |
|---|---|---|---|---|
| CURRENT STATE | NEXT STATE | PRIORITY SCHEDULE | CURRENT STATE | NEXT STATE |
| Ø | 1 | RØ R1 R2 R3 | Ø | 1 |
| 1 | 2 | R1 R2 R3 RØ | 1 | 3 |
| 2 | 3 | RØ R1 R2 R3 | — | — |
| 3 | 4 | R2 R3 RØ R1 | 3 | 7 |
| 4 | 5 | RØ R1 R2 R3 | — | — |
| 5 | 6 | R1 RØ R2 R3 | — | — |
| 6 | 7 | RØ R1 R2 R3 | — | — |
| 7 | Ø | R3 RØ R1 R2 | 7 | Ø |

Table I illustrates two modes of operation, each determined by a state of mode register 56. The two left-hand columns (Current State—Next State) define a mode of operation in which the state register cycles through its eight states in sequential fashion. This mode is selected by a "11" in mode register 56. The two right-hand columns show the state transitions (Current State—Next State) of state register 56 when the mode register 56 is a "Ø1.". The center column (labeled Priority Schedule) shows the available priority schedules for the associated bit positions (communicated on the requestor lines RØ–R3) of the data-in register 22 for the corresponding current state.

Table I is interpreted as follows: Reading each row from left to right, the first row (Current State) shows the content of state register 56, the state identification (Next State) the state register 56 will be set to by the EN.Ø signal (and CLK), and the priority order (Priority Schedule) of the bit positions on the incoming requestor lines RØ–R3 (highest priority on the left). Continuing, the next two rows (Current State, Next State) describe, as noted above, the state transitions of the state register 56 when the mode register 56 is a "Ø1." An example may help in understanding Table I.

Assume the following conditions: The Current State of state register 54 is "Ø"; the mode register 56 is "11"; the bit locations for incoming requestor lines R1 and R2 of the data-in register 22 are a ONE while the remainder of the data-in register 22 is ZERO. Given these conditions, the selection logic unit 50 will product a two-bit coded signal that is applied to the MPX 34, identifying the device controller 14 associated with the bit position brought in by requestor line R1 as the one determined by the subgroup priority selection circuit 26 to communicate with the processor unit 12; the device controller 14 associated with the bit position of requestor line R2 must wait its turn.

When this communication is complete, the EN.Ø signal is generated. At the same time the selection logic unit 50 derives NEXT STATE information from the content of state and mode registers 54 and 56, producing a "1" that is set in the state register 56. This new content of the state register 56 now defines the Current State: "1." The new Priority Schedule, R1 (highest priority), through RØ (lowest priority), is defined.

Another poll will be conducted, causing bit position for requestor R1 to be set to a ZERO, since it has just been serviced, and setting the bit position of the state register 54 corresponding to requestor line R2 again to a ONE (since the associated device controller's request for communication is yet to be honored). The output of the priority selection unit 50 proposed an R2 selection and, assuming no other bit position selections of higher priority, a ONE is set in the data-out register 24 to signal the device controller 14 associated with bit position R2 that can now communicate with processor unit 12. The next state register 54 is set to identify a new Current State: "2."

If the mode register 56 is set so that MODE=∅1, the priority schedule selections are in a "round-robin" manner; that is, the procession of states of the state register 54 is "∅"-"1"-"3"-"7"-"∅" and so on. As with MODE=11, transitions from the current state to the next state in MODE=∅1 occur after the device controller 14 associated with the current selection bit position on incoming requestor lines R∅-R3 is selected.

If the least significant bit position of the mode register is a ZERO ("∅"), the current state will be frozen and no "next state" transition will take place. Thus, if the mode register 56 is a "1∅" or a "∅∅," the current state becomes the next state perpetually, until the least significant bit of the mode register becomes a "1" in which the most significant bit dictates the type of current state to next state transition as described above.

As indicated above, the subgroup priority selection circuits 28-32 are identical in structure and operation to the subgroup priority selection circuit 26. Only the bit positions of the data-in register 22 received by each are different.

Similarly, the structure and operation of the master priority selection circuit 40 is the same, with the following exceptions. In place of the bit positions brought in by the requestor lines R∅-R3, the master priority selection circuit 40 receives the AVAIL signals from each of the subgroup priority selection circuits 26-32, selecting one of them, according to a priority schedule, for use as the SELECT signal. Also, the state register (not shown) of the master priority selection circuit 40 is changed in the same manner as that described with respect to the subgroup priority selection circuit 26, except that a change is effected after each device controller 14 is selected.

While the above provides a full and complete disclosure of the invention, it should be obvious to those skilled in this art that modifications and alterations of the disclosed invention can readily be implemented without departing from the scope and spirit of the invention. The scope of the invention is limited only by the breadth of the claims.

I claim:

1. In a data processing system including a processor and a plurality of external devices that communicate with the processor over a single I/O bus, where several devices may simultaneously request access to the processor, a priority selection device for applying a sequence of priority selection tables, selected from one of a plurality of possible sequences of selection tables, by the processor, to assign priority to the requesting devices and grant the device with highest priority access to the processor, said priority selection device comprising:

a first register for receiving mode data from the processor to preset said first register to a selected one of a plurality of mode states;

a second register, coupled to the I/O bus, for storing request data indicating the identity of a plurality of requesting devices requesting access to the processor;

a state register responsive to state data for defining said given priority selection table;

a selection unit, responsive to said mode data from said first register, said request data from said second register, and said state data from said state register, for selecting one of the requesting devices indicated by said request data according to the priority selection table defined by said state data wherein said selection unit generates next state data, in response to said mode data and said state data, defining a second given priority selection table;

a multiplexer, controlled by said processor, for transferring either said next state data from said selection unit or initial state data from the processor, to said state register.

* * * * *